United States Patent [19]

Kausch

[11] Patent Number: 4,833,026
[45] Date of Patent: May 23, 1989

[54] BREATHABLE, WATERPROOF SHEET MATERIALS AND METHODS FOR MAKING THE SAME

[75] Inventor: William L. Kausch, Cottage Grove, Minn.

[73] Assignee: Minnesota Mining and Manufacturing Company, St. Paul, Minn.

[21] Appl. No.: 106,719

[22] Filed: Oct. 8, 1987

[51] Int. Cl.⁴ .......................... C08J 9/36; B29C 55/10
[52] U.S. Cl. ..................... 428/315.5; 264/41; 264/136; 264/147; 264/154; 264/288.8; 428/910
[58] Field of Search ...................... 264/136, 154, 288.8, 264/147, 41; 428/315.5, 910

[56] References Cited

U.S. PATENT DOCUMENTS

| | | | |
|---|---|---|---|
| 3,407,253 | 10/1968 | Yoshimura et al. | 264/288.8 X |
| 3,953,566 | 4/1976 | Gore | 264/288 |
| 4,001,367 | 1/1977 | Guthrie et al. | 264/288.8 X |
| 4,061,821 | 12/1977 | Hayano et al. | 264/41 X |
| 4,089,997 | 5/1978 | Van Paesschen et al. | 427/171 |
| 4,115,334 | 9/1978 | Gerow | |
| 4,194,041 | 3/1980 | Gore et al. | 428/315 |
| 4,214,035 | 7/1980 | Heberger | 428/340 |
| 4,364,885 | 12/1982 | Kanai et al. | 264/289.6 X |
| 4,443,511 | 4/1984 | Worden et al. | 428/198 |
| 4,457,254 | 7/1984 | Hungerford | 118/34 |
| 4,539,256 | 9/1985 | Shipman | 428/315 |
| 4,613,544 | 9/1986 | Burleigh | 428/315.5 |
| 4,726,989 | 2/1988 | Mrozinski | 428/315.5 |

FOREIGN PATENT DOCUMENTS 1028703   7/1983   U.S.S.R. .............................. 264/136

*Primary Examiner*—Philip Anderson
*Attorney, Agent, or Firm*—Donald M. Sell; Walter N. Kirn; Dale E. Hulse

[57] ABSTRACT

The present invention relates to breathable, waterproof sheet materials comprising a microporous polymeric film and a hydrophilic filler material infiltrated into the pores of the film, and to methods for making such sheet materials. In the methods of the present invention, the liquid hydrophilic material or precursor thereof is infiltrated into the pores of the microporous film after the film has been stretched in the lengthwise direction, but before the film is stretched in the transverse direction. By coating the microporous film prior to the transverse stretching step, superior waterproof sheet materials are obtained.

42 Claims, 7 Drawing Sheets

BREATHABLE, WATERPROOF SHEET MATERIALS AND METHODS FOR MAKING THE SAME

BACKGROUND

1. The Field of the Invention

The present invention relates to breathable, waterproof sheet materials for protecting against water and other liquids, which may be used, for example, in fabricating waterproof clothing articles, and to methods for making such waterproof sheet materials.

2. The Prior Art

The evolution of protective rainwear has seen the production of garments made of so-called "oil skins" (cloth impregnated with oil to make it waterproof), cloth impregnated or covered with hydrophobic polymeric material such as polyurethane or polyvinyl chloride, and plastic sheet material such as polyvinyl chloride or polyethylene sheet materials. Such materials, however, for the most part do not allow for the evaporation of perspiration.

Fabrics treated with hydrophobic liquids or polymeric materials such as silicone or fluorocarbon oil or resin are materials known to provide adequate evaporation of perspiration, but they permit the passage of liquid water therethrough, commonly leaking when rubbed, touched, or otherwise contacted or flexed.

U.S. Pat. No. 4,194,041 Gore et al.) is representative of a number of patents which describe coatings or laminates purported to provide waterproof articles which do not leak when touched and are breathable. This patent describes a layered article for use in waterproof garments or tents comprising at least two layers; an interior, continuous hydrophilic layer that allows water to diffuse therethrough, prevents the transport of surface active agents and contaminating substances such as those found in perspiration, and is substantially resistant to pressure induced flow of liquid water, and a hydrophobic layer that permits the transmission of water vapor. The hydrophobic layer is preferably waterproof microporous polytetrafluoro-ethylene (PTFE) or polypropylene, which permits the passage of moisture vapor through the pores thereof. The hydrophilic layer transfers moisture vapor therethrough whereupon it passes through the porous hydrophobic layer. Various means of joining the layers are suggested including the application of hydraulic pressure to force the hydrophilic polymer to penetrate into the surface void spaces of the hydrophobic layer.

U.S. Pat. No. 4,443,511 (Worden et al.) discloses a layered article similar to that of U.S. Pat. No. 4,194,041, but formed of a breathable polytetrafluoroethylene first layer mechanically stretched at least about 5% beyond its yield point having a surface layer of elastomeric hydrophilic material having a surface in interlocking relationship with the inner face of the first layer. The interlocking relationship is said to be brought about by flowing the hydrophilic elastomeric material into the layer of hydrophobic material and then solidifying the hydrophilic material.

While these patents have alleviated some of the problems known to the art, they require lamination and the attendent deficiencies created thereby, e.g., an exposed weak hydrophilic layer subject to abrasion and separation and an exposed porous hydrophobic surface that is subject to contamination.

A significant advancement in the art which overcomes the aforementioned problems is disclosed in U.S. Pat. No. 4,613,544 (Burleigh). This patent describes waterproof, moisture vapor permeable, unitary, i.e., nonlaminated and single thickness, sheet materials that are ideally suited for use in waterproof garments, tents, and outdoor gear such as knapsacks and the like, combining exceptional durability with excellent hand or drape. These materials are made by taking stretched microporous films and coating them with a hydrophilic material or precursor thereof which solidifies and fills the pores of the microporous films.

The process disclosed in U.S. Pat. No. 4,613,544 provides good quality waterproof materials. However, the unitary sheet materials made in accordance with the process of that patent generally do not have sufficient dimensional stability or strength at the thicknesses typically used to be easily manufactured under the conditions of temperature or machine induced tension needed to transport the film and cure the hydrophilic material during manufacturing. This is partially because microporous films in general are somewhat thermally unstable, and thus shrink upon heating. Moreover, microporous films are extremely fragile, thereby rendering it very difficult to apply the hydrophilic material and fill the micropores of the microporous film without damaging the film. Hence, in the practice of the invention of U.S. Pat. No. 4,613,544, a supporting web or liner is often applied to the microporous film so as to stabilize it and protect it during processing. The hydrophilic material is then applied to the supported microporous film in accordance with U.S. Pat. No. 4,613,544, and if desired a layer of cloth fabric is applied thereto. Only then is the support web or liner removed.

As will be appreciated, the usage of such a support web or liner to support and protect the microporous film results in increased processing steps and decreased processing efficiency. Moreover, where such a support web or liner is employed, the process for forming the microporous film and the process of combining the hydrophilic material with the microporous film to produce the unitary waterproof material are conducted in separate processing steps using separate apparatus, again rendering the overall process less efficient than would be desired.

From the foregoing, it will be appreciated that it would be a significant advancement in the art to provide methods for preparing breathable, waterproof sheet materials similar to the type disclosed in U.S Pat. No. 4,613,544, without the need for a supporting web or liner, thereby greatly simplifying the process and allowing the microporous film to be formed, combined with the hydrophilic filler material, and laminated to a cloth fabric if desired, all in the same processing line. Such methods and waterproof materials obtained thereby are disclosed and claimed herein.

BRIEF SUMMARY OF THE INVENTION

In the methods disclosed in U.S. Pat. No. 4,613,544, the hydrophilic material is applied to the microporous film after stretching the microporous film in the lengthwise and transverse directions to yield the porosity desired. However, in the present invention, it has been discovered that greatly improved processing can be achieved by applying the hydrophilic material after only an initial stretch in the lengthwise direction, and subsequently stretching the microporous film in the transverse direction after the hydrophilic material has been applied thereto. Such a unique processing step allows the microporous film to be impregnated with the hydrophilic material without the use of a support web or liner to provide structural support for the microporous film. Further, the lubricating action of the hydrophilic material before the transverse stretching step greatly facilitates the ability of the material to be stretched in the transverse direction, and less hydrophilic material is needed than in the prior art. Another surprising benefit of the process of the present invention is that the hydrophilic material is more evenly distributed throughout the microporous structure of the film, thereby yielding a smooth and continuous surface that can be more easily laminated to cloth fabric if desired.

Although the present invention is particularly suited for the fabrication of breathable, waterproof sheet materials, the present invention may be used to prepare a variety of unitary sheet materials from a polymeric material and a filler material, employing the following method steps:

(1) providing a sheet of polymeric material which is capable of becoming microporous upon stretching;
(2) stretching the polymeric sheet in a first direction so as to render the sheet at least partially microporous;
(3) coating the polymeric sheet with a liquid filler material which is capable of infiltrating the micropores of the sheet;
(4) stretching the coated polymeric sheet in a second direction so as to render the sheet more micorporous, the liquid filler material infiltrating the micropores of the sheet; and
(5) converting the liquid filler material from a liquid state to a relatively solid state.

It will be understood that as used in step (1) above and elsewhere herein, the term "polymeric material which is capable of becoming microporous upon stretching" not only includes polymeric materials which are initially substantially nonporous and which become significantly microporous upon stretching, but also materials which are already somewhat microporous and which can be made increasingly more microporous upon stretching.

The present invention provides an improved method for manufacturing the type of materials disclosed in U.S. Pat. No. 4,613,544, while maintaining the beneficial properties and characteristics of those materials. Thus, although the unitary sheet materials of the present invention have added advantages, they do resemble to a large extent the materials provided by U.S. Pat. No. 4,613,544.

Hence, the unitary sheet materials of the present invention, in very thin thicknesses, e.g., from about 7 micrometers to about 125 micrometers, prevent water and other liquid penetration therethrough, even when the liquid is propelled thereagainst with great force as in a rainstorm. The unitary sheet materials, while waterproof, are also very water vapor permeable, being capable of constructions which allow moisture vapor from perspiration to evaporate therethrough at a rate sufficient to maintain the skin of one wearing a garment containing the sheet material in a reasonably dry state with normal use, without, however, becoming contaminated with perspiration impurities which could otherwise cause eventual leakage through the sheet. Being unitary, the sheet materials of this invention are very resistant to loss of their waterproof and moisture vapor permeable properties through abrasion and rough wear as their properties are reasonably uniform throughout their thicknesses, being neither laminated nor otherwise applied in layers to provide these properties.

The waterproof, moisture vapor permeable, unitary sheet materials of this invention comprise a microporous matrix having pores comprising continuous passages extending through their thicknesses and opening into the opposite surfaces thereof, which passages are sufficiently filled with a water vapor permeable, liquid water impermeable, hydrophilic material to prevent the passage of water and other liquids therethrough while permitting the passage of moisture vapor therethrough. While the unitary sheet materials can be tailored for varying rates of moisture vapor permeability therethrough without disturbing the waterproofness thereof, a moisture vapor transmission rate (MVTR) of at least 1000 $g/m^2$ per 24 hours is preferred. The MVTR can be increased to 2000 $g/m^2$ or higher without significantly weakening the sheet material. For purposes of the present invention, these and all other MVTR values set forth herein were measured in accordance with the MVTR test (commonly known as the "Inverted Cup Test") set forth in U.S Pat. No. 4,613,544.

The term "waterproof" is used herein to describe sheet materials which are capable of preventing the passage therethrough of liquid water by capillary action and under varying natural atmospheric conditions including pressure driven flow as may be encountered in a rainstorm. "Water vapor permeable" or "moisture vapor permeable" is used herein to describe materials which readily permit the passage of water vapor therethrough but which do not allow the passage of liquid water therethrough. The term hydrophilic is used herein to describe materials, usually polymers, which are capable of absorbing water exposed thereto in significant quantity, typically more than about 10% by volume.

DETAILED DESCRIPTION OF THE PREFERRED EMBODIMENTS

Each waterproof, unitary sheet material prepared in accordance with the present invention comprises a microporous matrix or film having continuous pores extending through its thickness which are at least partially infiltrated, and preferably substantially filled, with a hydrophilic material which is both moisture vapor permeable and liquid water impermeable. Thus, the unitary sheet material is a two phase, homogeneous unitary sheet material comprising the microporous matrix as one phase and the hydrophilic material as the other phase.

It has surprisingly been found that microporous films which have been infiltrated with a hydrophilic material can be stretched substantially without sacrificing their breathable and waterproof characteristics. Further, it has been surprisingly found that these materials may be stretched with greater ease in the transverse direction when the hydrophilic material is infiltrated before the transverse stretching step.

Microporous films useful in the present invention may be made in accordance with virtually any process presently known for producing the same, with the additional step of applying a filler material to the film after the lengthwise stretching step but before the transverse stretching step. For example, the method for preparing microporous materials disclosed in U.S. Pat. No. 3,953,566, which discloses a process for making microporous sheets exclusively of polytetrafluoroethylene (PTFE), and especially U.S. Pat. No. 4,539,256 (Shipman) assigned to the assignee of the present application which discloses the preparation of microporous sheet materials from other thermoplastic polymers, may be used in connection with the present invention. U.S. Pat. No. 4,539,256 (Shipman) is incorporated herein by reference.

The hydrophilic filler material is incorporated into the micropores of the microporous material so as to form a unitary sheet material such as is disclosed in U.S. Pat. No. 4,613,544 (Burleigh), which patent is also incorporated herein by reference. However, in the present invention, the hydrophilic filler material of the Burleigh patent is applied to the microporous material of the Shipman patent between the lengthwise stretching step and the transverse stretching step of the Shipman patent. A schematic illustration of one presently preferred embodiment of the present invention will now be explained.

Figure 1:
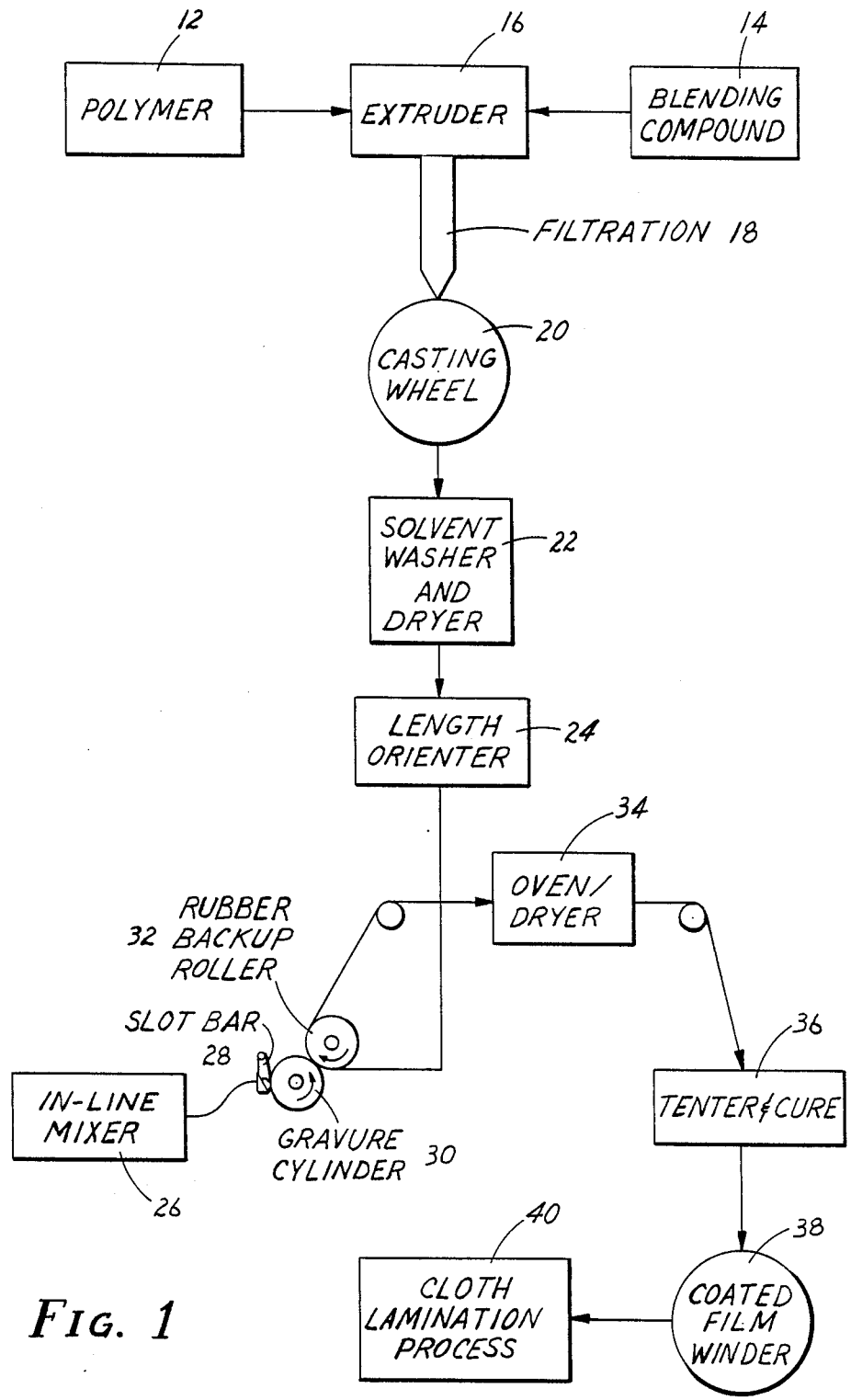
FIG. 1 is a schematic diagram of one presently preferred embodiment of the methods of the present invention.
Figure 2A:
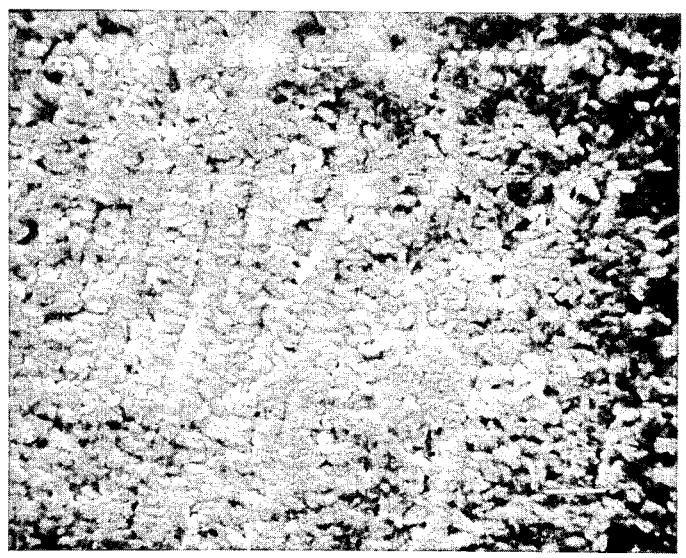
FIG. 2A is a photomicrograph (taken at a magnification of 5000×) of the surface structure of a polyethylene sheet made in accordance with Example 3, before the polyethylene sheet had been stretched in the lengthwise direction, before the sheet had been coated with the liquid polyurethane precursor material, and before the sheet had been stretched in the transverse direction.
Figure 2B:
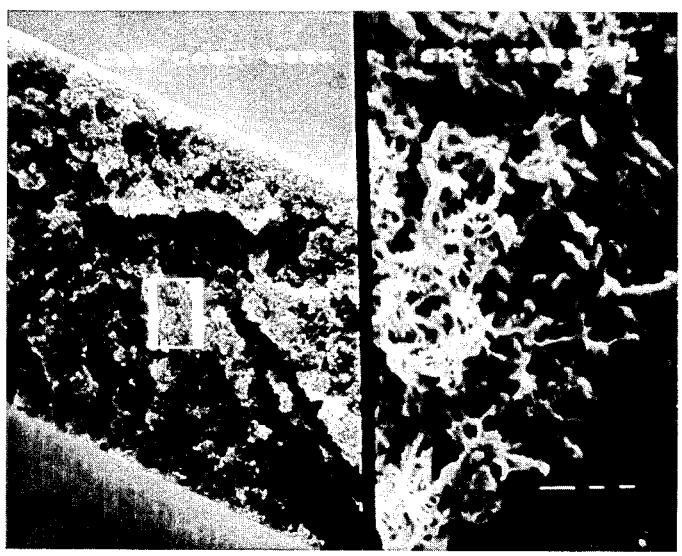
FIG. 2B is a photomicrograph of the internal structure of the polyethylene sheet of FIG. 2A taken along a cross-section of the polyethylene sheet. The left half of the photomicrograph is shown at a magnification of 600×, and a portion of the left half (identified by a small rectangular border within the left half) is further enlarged to a magnification of 6000× and is presented as the right half of the photomicrograph in order to show further details of the internal structure of the polyethylene sheet.
Figure 2C:
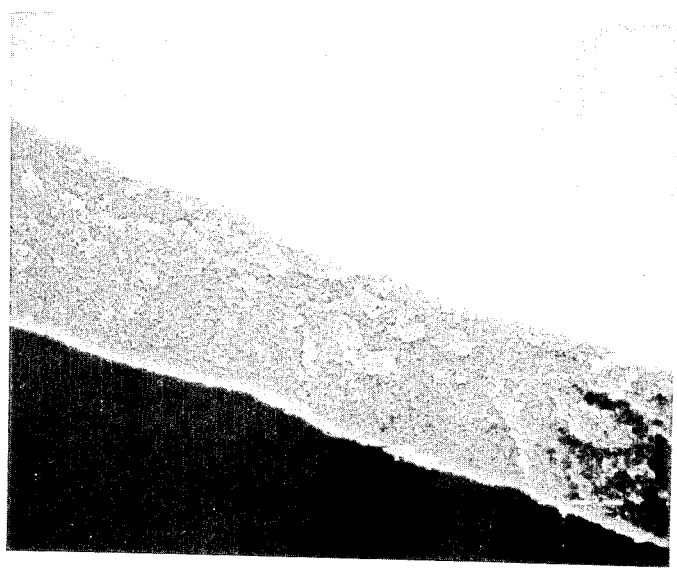
FIG. 2C is a perspective photomicrograph of the surface and edge of the polyethylene sheet of FIG. 2A shown at a magnification of 350×.
Figure 3A:
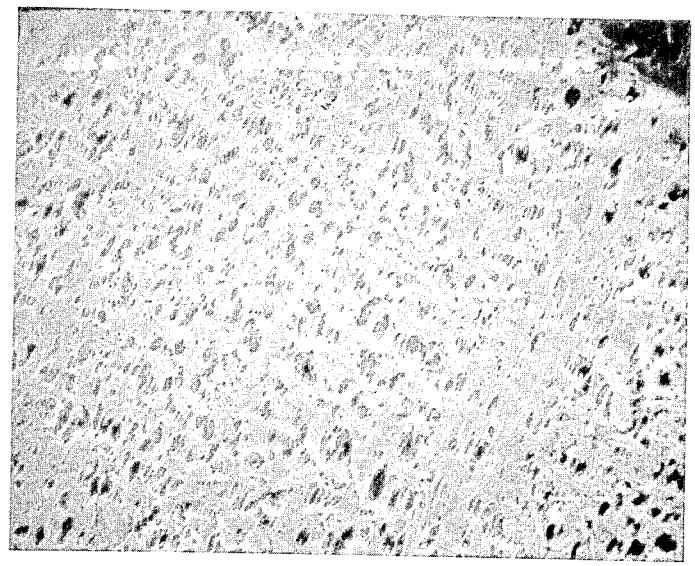
FIG. 3A is a photomicrograph (taken at a magnification of 5000×) of the surface structure of a polyethylene sheet made in accordance with Example 3, after the polyethylene sheet had been stretched in the lengthwise direction, but before the sheet had been coated with the liquid polyurethane precursor material or stretched in the transverse direction. In this and each of FIGS. 3B and 3C, the microporous structure formed by stretching the polyethylene sheet in the lengthwise direction can be easily viewed.
Figure 3B:
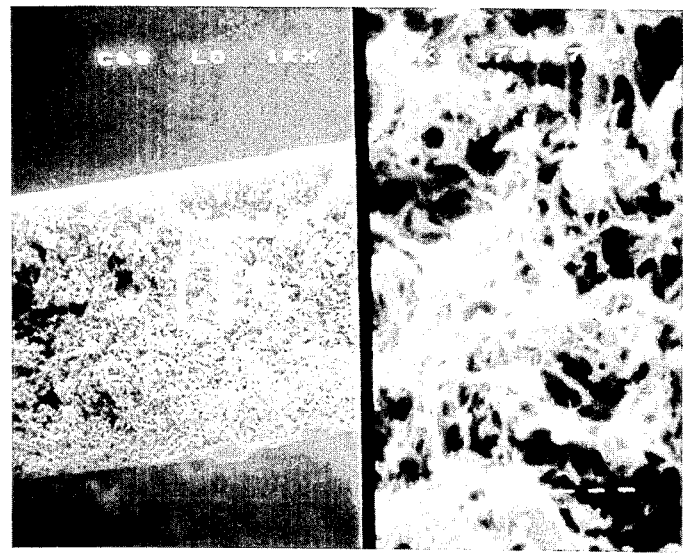
FIG. 3B is a photomicrograph of the internal structure of the polyethylene sheet of FIG. 3A taken along a cross-section of the polyethylene sheet. The left half of the photomicrograph is shown at a magnification of 1000×, and a portion of the left half (identified by a small rectangular border within the left half) is further enlarged to a magnification of 10,000× and is presented as the right half of the photomicrograph in order to show further details of the internal structure of the polyethylene sheet.
Figure 3C:
FIG. 3C is a perspective photomicrograph of the surface and edge of the polyethylene sheet of FIG. 3A shown at a magnification of 750×.
Figure 4A:
FIG. 4A is a photomicrograph (taken at a magnification of 5000×) of the surface structure of a polyethylene sheet made in accordance with Example 3, after the polyethylene sheet had been stretched in the lengthwise direction and after the sheet had been coated with the liquid polyurethane precursor material, but before the sheet had been stretched in the transverse direction. In this and each of FIGS. 4B and 4C, the infiltration of the liquid polyurethane precursor material into the pores of the sheet can be clearly viewed.
Figure 4B:
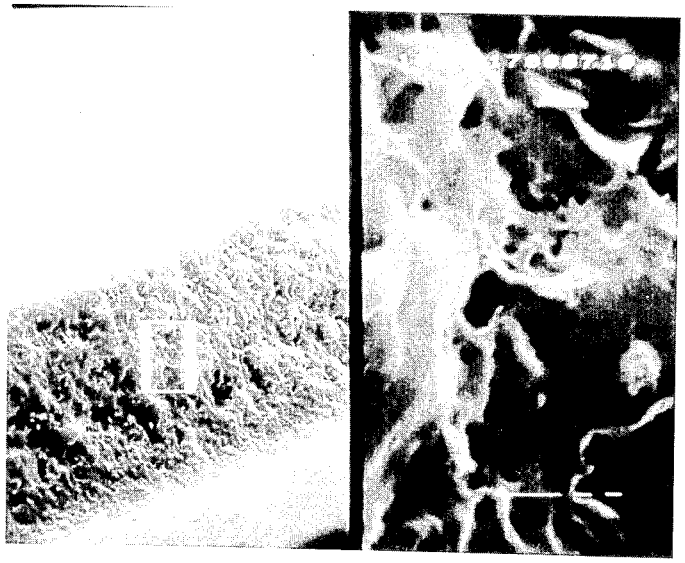
FIG. 4B is a photomicrograph of the internal structure of the coated polyethylene sheet of FIG. 4A taken along a cross-section of the coated polyethylene sheet. The left half of the photomicrograph is shown at a magnification of 1000×, and a portion of the left half (identified by a small rectangular border within the left half) is further enlarged to a magnification of 10,000× and is presented as the right half of the photomicrograph in order to show further details of the internal structure of the coated polyethylene sheet.
Figure 4C:
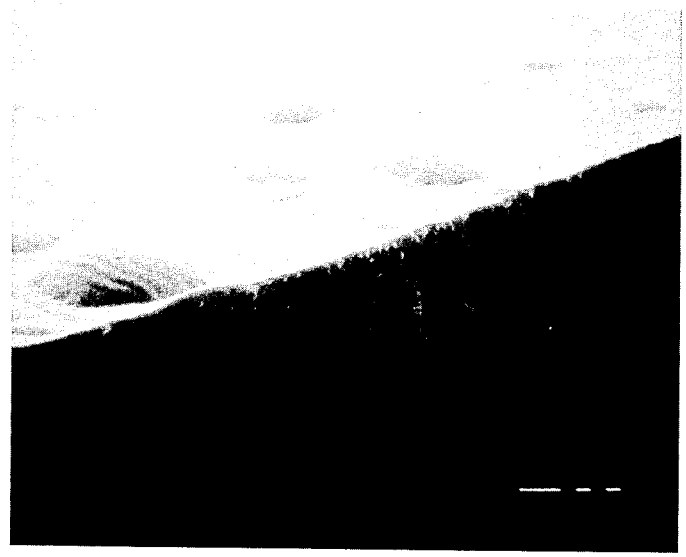
FIG. 4C is a perspective photomicrograph of the surface and edge of the coated polyethylene sheet of FIG. 4A shown at a magnification of 750×.

Referring now to FIG. 1, a melt blend solution is obtained by feeding a mixture of a crystallizable thermoplastic polymer 12 and a blending compound 14 into an extruder 16. Preferably, extruder 16 is a twin screw extruder of the type disclosed in U.S. Pat. No. 4,539,256. In passing through the extruder 16, the mixture of polymer and blending compound is heated to a temperature of at least about 25° C. above the melting temperature of the crystallizable polymer (but below the thermal degradation temperature of the polymer). The proportions of polymer and blending compound introduced into the extruder depend upon the particular polymer and blending compound used, and U.S. Pat. No. 4,539,256 provides ample guidance for such proportions. When the presently most preferred system of the present invention is employed, involving a polyethylene polymer and a mineral oil blending compound, the polyethylene represents from about 10% to about 50% by weight, while the mineral oil correspondingly represents from about 50% to about 90% by weight. Preferably, the polyethylene polymer represents from about 25% to about 45% by weight, and the mineral oil correspondingly represents from about 55% to about 75% by weight. In the presently most preferred embodiment, the polyethylene represents from about 35% to about 42% by weight, while the mineral oil correspondingly represents from about 58% to about 65% by weight.

Upon formation of the melt blend solution, the melt blend solution is preferably filtered in filtration step 18 using from about a 20 to about a 100 micron filter so as to remove any gel particles and polymer impurities. The melt blend solution is then extruded onto a casting wheel 20 where the melt blend is immediately quenched, i.e., the temperature is lowered below the crystallization temperature of the crystallizable polymer by maintaining the casting wheel at such lowered temperature. In the case of polyethylene, casting wheel 20 is maintained at a temperature of from about 15° C. to about 65° C., preferably from about 30° C. to about 55° C. The casting wheel is typically rotated at a speed of from about 1 to about 100 revolutions per minute.

Upon cooling, the thermoplastic polymer in the extruded film crystallizes to cause phase separation to occur between the blending compound and the polymer, thereby providing a sheet comprising an aggregate of a first phase comprising particles of crystallized thermoplastic polymer and a second phase comprising the compound with adjacent thermoplastic polymer particles being distinct but having a plurality of zones of continuity. The extruded, phase separated film then advances to solvent washer and dryer 22 where the film is first treated with a solvent to remove the blending compound from the phase separated film, and then dried to remove the solvent. Where the blending compound employed is mineral oil, a suitable solvent for removing the mineral oil is 1,1,1-trichloroethane. As will be appreciated, the temperature in the solvent dryer 22 will be directly dependent upon the boiling point of the solvent employed. In the case of 1,1,1-trichloroethane, a temperature of from about 20° C. to about 60° C. in the solvent dryer 22 is suitable to remove the solvent.

Next, the film is stretched in the lengthwise or machine direction by length orienter 24 so as to render the film microporous. In this regard, the film is stretched anywhere up to about 600% of its original length by length orienter 24. Preferably, for purposes of the present invention, the film is stretched from about 100% to about 400% of its original length, and most preferably, from about 200% to about 300% of its original length. The precise amount of lengthwise stretch obtained can be carefully controlled by regulating the exit speed from length orienter 24 in relation to the speed of casting wheel 20. For example, if the exit speed of the length orienter is set at a speed three times faster than the casting wheel speed, the film will be stretched 300% in the lengthwise direction by length orienter 24. Additionally, the temperature within length orienter 24 should be maintained at about 20° C. to about 80° C., and preferably at about 45° C. to about 60° C.

Upon exiting length orienter 24, the microporous film has a thickness of from about 25 to about 150 micrometers, preferably from about 30 to about 75 micrometers, and most preferably from about 33 to about 51 micrometers.

From length orienter 24, the microporous film is next coated with the hydrophilic filler material. First, where the hydrophilic material is a polymeric material, the various monomers which are to be polymerized are mixed in in-line mixer 26 under conditions such that polymerization is started but is not substantially completed until after transverse stretching step 36 as will be explained in more detail hereinafter. For example, where the hydrophilic material to be applied to the microporous film is a polyurethane, the polyol and polyisocyanate are mixed within in-line mixer 26 at room temperature to form a precursor material which gradually polymerizes into the hydrophilic polyurethane. The polyurethane precursor material within in-line mixer 26 is mixed with a suitable solvent such as methyl ethyl ketone to facilitate coating onto the microporous film. The viscosity of the resultant polyurethane precursor solution is from about 1 to about 500 centipoise, preferably from about 20 to about 100 centipoise, and most preferably from about 20 to about 60 centipoise.

The precursor composition is then extruded through slot bar 28 onto gravure cylinder 30. A rubber backup roll 32 cooperates with gravure cylinder 30 so that as the microporous film is passed therebetween, a suitable quantity of the precursor material is applied to the microporous film.

During coating of the precursor solution onto the film, the percent solids should be held between about 10% and about 70% solids, preferably from about 30% to about 65%, and most preferably from about 40% to about 60%. Controlling the "percent solids" refers to preserving the relative volume of nonvolatile ingredients in the precursor solution by utilizing, for example, a closed solution handling system which prevents premature solvent evaporation before the precursor solution is applied to the film, thus maintaining the volume ratio of nonvolatile ingredients to solvent established in in-line mixer 26.

The gravure cylinder 30 can be adjusted so as to meter the appropriate amount of precursor solution to the microporous film. Pressure is preferably applied to the microporous film between gravure cylinder 30 and rubber backup roll 32 in order to facilitate infiltration of the precursor solution into the pores of the microporous film. For example, pressures of from about 10 psi (0.7 kg/cm$^2$) to about 100 psi (7 kg/cm$^2$), preferably from about 20 psi (1.4 kg/cm$^2$) to about 50 psi (3.5 kg/cm$^2$), are employed between gravure cylinder 30 and rubber backup roll 32.

The precursor solution or liquid filler material is applied to the microporous film in an amount such that the liquid filler material (without solvent) represents from about 50% to about 600% of the weight of the microporous film prior to coating, preferably from about 100% to about 500% by weight of the uncoated microporous film, and most preferably from about 300% to about 400% by weight of the uncoated microporous film. This coating weight is sometimes referred to as the "add-on". Add-on is defined as the weight of the coating applied to the film (calculated by subtracting the weight of the uncoated film from the weight of the coated film) divided by the weight of the uncoated film, and then multiplying this ratio by 100 to provide the percent add-on.

The coating is thus applied in an amount sufficient to infiltrate the micropores of the film to the degree desired. Preferably, the coating is applied in an amount sufficient to substantially fill the micropores.

The coated microporous film then passes through oven/dryer 34 which removes the solvent used to coat the precursor material onto the microporous film. The temperature maintained within oven/dryer 34 and residence time of the microporous film within the oven/dryer 34 should be sufficient to effect removal of the solvent by evaporation, while avoiding complete curing of the precursor material. Where the liquid filler material is a precursor of a polyurethane, a temperature within the range of from about 20° C. to about 150° C., preferably from about 35° C. to about 120° C., and most preferably from about 75° C. to about 110° C. should be maintained in oven/dryer 34, and the residence time of the microporous film within the oven/dryer 34 is preferably from about 10 seconds to about 60 seconds, most preferably from about 2.0 seconds to about 40 seconds. However, it will be appreciated that other time and temperature ranges may be useful for other types of coatings and film systems.

After passing through oven/dryer 34, the coated microporous film enters center 36 where the coated microporous film is first stretched in the transverse direction to render the film even more microporous and then heated for a sufficient period of time to completely cure the precursor material into the relatively solid hydrophilic material. Thus, in the first zone or stretch zone of the tenter 36, the coated microporous film is stretched in the transverse or widthwise direction, i.e., the direction perpendicular to the machine direction, up to about 600% of its original width. Preferably, the coated microporous film is stretched in the transverse direction from about 100% to about 400% of its original width, and most preferably from about 150% to about 300% of its original width.

The tentering or stretching of the material in the transverse or widthwise direction is carried out on conventional equipment. By applying the hydrophilic filler material before the transverse stretch, higher transverse stretch ratios may be obtained in the present invention than in the prior art.

In the stretch zone, the microporous film is stretched while heated at a temperature (in the case of polyethylene) of from about 35° C. to about 95° C., preferably from about 55° C. to about 80° C., and most preferably from about 60° C. to about 77° C., for a period of time from about 10 seconds to about 60 seconds, most preferably from about 20 seconds to about 40 seconds.

After stretching in the transverse direction, the biaxially stretched microporous film enters the second zone or cure zone of tenter 36. Here, the biaxially stretched microporous film is heated to a temperature sufficient to completely cure the hydrophilic filler material. In the case of a polyurethane filler material, the film is heated to a temperature of from about 35° C. to about 150° C., preferably from about 95° C. to about 125° C., and most preferably from about 105° C. to about 120° C. for a period of at least about 20 seconds, preferably from about 40 seconds to about 5 minutes. Again, other time and temperature ranges would be useful for other coating and film chemistries.

If desired, the biaxially stretched microporous film exiting from tenter and cure apparatus 36 may be passed through a post cure oven (not shown) where the film is additionally heated to a temperature similar to that of the cure zone of the tenter 36 in order to ensure complete curing of the liquid filler material into the solid hydrophilic material.

The biaxially stretched microporous film is then wound by coated film winder 38, and if desired, can be passed on to an optional cloth lamination process 40 where the microporous film is laminated to a sheet of fabric so as to form a waterproof clothing material.

It will be appreciated that the process steps set forth in the schematic diagram of FIG. 1 are merely exemplary of one presently preferred method for carrying out the present invention. It will be understood that the most important step of the present invention lies in the fact that the liquid filler material is applied to the microporous material before the transverse stretching step which is accomplished by tenter 36. Hence, many variations on the other processing steps are possible and well within the skill of the art.

Further, it will be appreciated that the liquid filler material may be applied to the film in a variety of ways. For example, instead of the gravure coating process shown in FIG. 1, a dip coating, extrusion coating, roll coating, spraying, or padding method could be employed to apply the liquid filler material to the film. Further, although a 25 or 40 line per inch (10 or 16 line per centimeter) trihelical gravure is suitable for use in the gravure coating method of the present invention, other apparatus could also be employed, as long as the gravure cylinder has sufficient volume capacity to apply the proper amount of filler material needed to fill the pores of the microporous film.

The following more detailed description of the nature of the hydrophilic material filled, microporous films of the present invention will further supplement the embodiment of the present invention shown in FIG. 1.

The microporous film or matrix can be virtually any material having continuous micropores through its thickness which can be filled with a liquid composition comprising the hydrophilic material, or preferably its precursor, before the film is stretched in the transverse direction to give the final desired degree of porosity. While it is preferred that the entire area of the resultant sheet material be microporous, sheets having solid, nonporous areas as well as microporous areas may be employed for particular applications. The pore size of the microporous matrix should be small in order to obtain uniform and adequate filling of the pores through capillary action and through suction of the liquid filler material into the pores during the transverse stretching step. The average size of the pores of the matrix is such that they are typically indistinguishable under magnification (e.g., 100×) of a conventional optical microscope, but usually readily visible under magnification (e.g., 1000×) of an electron microscope. The pore size of a matrix will be much smaller than the matrix thickness. Preferably, the average pore size is less than about 10% of the thickness of the matrix. The average pore size for a matrix having a thickness of about 10 to about 50 micrometers will therefore typically be on the order of about 1 to 5 micrometers or less. By contrast, the average pore size or opening of a woven fabric is about the same magnitude as its thickness. A matrix which has a pore size which is too large can be readily identified as it will permit the passage of water therethrough as hydrophilic material solidified therewithin will not sufficiently close the pores against the passage of liquid therethrough. Useful microporous matrices have a void volume of from about 10% to about 85% or higher, preferably of at least about 25%, and more preferably, from about 50% to about 85%.

The thickness of the microporous films of the present invention can be varied, but is preferably from about 7 micrometers to about 125 micrometers, more preferably from 7 micrometers to about 50 micrometers, and most preferably from about 7 micrometers to about 25 micrometers.

The microporous polymeric matrix can be prepared by any known method of any polymeric material which is substantially impenetrable by water, i.e., absorbing no more than 5% water by weight under normal atmospheric conditions, and capable of forming a microporous sheet. Useful polymers for forming the microporous polymeric matrix include polyolefins such as polyethylene and polypropylene, polyethylene-polypropylene copolymers, polyethylene terephthalate, polyamides such as polycaprolactam, polyvinylidene fluoride, polybutylene terephthalate, polyester copolymers, and polytetrafluoroethylene. Any of these materials can be formed into a useful polymeric matrix by processes already known in the art, such as that disclosed in U.S. Pat. No. 4,539,256, as modified by the present invention to include the step of applying the hydrophilic filler material to the film before stretching it in the transverse direction. Polyolefins such as polyethylene are most presently preferred, as they are tough, have excellent hand or drape, and are easily wet by hydrophilic materials or precursors thereof in accordance with the present invention.

The polymeric materials used to form the microporous matrices may, of course, include various other additive ingredients to impart specific properties to the product or as a process aid. For example, the polymeric material may include ultraviolet light stabilizers, antioxidants, bacteriostats, insect repellants, antistatic agents, coloring dyes, plasticizers, and the like. The polymeric materials may also include residues left from processing; however, these are usually in such small amounts that they do not significantly adversely affect the final product.

Further, the polymeric materials may incorporate a nucleating agent, for example, in the manner described in commonly assigned U.S. Pat. No. 4,726,989, (Mrozinski), which patent herein by reference. In such an instance, the nucleating agent would merely be added to the polymer/blending compound melt blend before extrusion of the same into a film, as taught in U.S. Pat. No. 940,731.

The polymeric materials for the microporous matrices are preferably hydrophobic, but may also be hydrophilic, and they are useful so long as an infiltrate carrying the hydrophilic filler material is capable of filling the pores, and, when solidified, prevents the passage of liquid water therethrough while allowing moisture vapor passage therethrough.

The selection of the polymer to form the microporous matrix will depend upon the ultimate product utility. For example, if the waterproof sheet material of the present invention is to be used in the manufacture of waterproof clothing, flexiblity and drape are desirable characteristics. Microporous polyethylene matrices are therefore preferred for such use.

The hydrophilic filler materials useful in the present invention are polymeric substances which are typically void free, but may contain closed cells. These filler materials do not allow the passage of gases or liquids through open channels or pores in the microporous film, but do transfer substantial amounts of water vapor through the pores by absorbing water vapor on one side of the film, where the water vapor concentration is high, and evaporating it on the opposite side where the water vapor concentration is low. Liquid water is not transferred through the filler material by capillary action or by wicking.

Films of the hydrophilic filler materials tend to be weak and easily torn, especially when swollen with water. Even if such films are laminated to strong support layers, they are still subject to abrasion and leakage. Thus, by infiltrating the hydrophilic filler material into a microporous matrix according to the present invention, the matrix protects the hydrophilic filler material from abrasion without inhibiting its moisture vapor transmission properties, and this combination often reinforces the microporous matrix to provide a sheet material which is stronger than its separate components in sheet form.

The hydrophilic filler material or its precursor must have an initial state which is liquid and which wets the surface of the polymeric matrix so that it can flow or be imbibed into the microporous matrix. Further, the hydrophilic filler material must be capable of being converted from the liquid state to a relatively solid state which is both liquid water impermeable and water vapor permeable, and of sticking to the passage walls of the pores of the polymeric matrix. Preferably, the hydrophilic filler material is prepared from a monomer or a prepolymer which can be infiltrated either neat or in solvent into the pores of the microporous matrix and in situ cured to form the solid hydrophilic filler material. The hydrophilic filler material may have a molten state which permits its infiltration, and a solid or semi-solid state when cooled. Solvent solutions of hydrophilic polymers may also be infiltrated and the solvent evaporated. Moreover, combinations of these techniques may be used, e.g., infiltration of a solvent solution of a prepolymer and curing before or after solvent removal, e.g., by crosslinking. When solvents are used, care should be taken in the solvent selection to avoid adversely altering the microporous matrix. The same care should be taken when using other processing conditions such as heat.

In one presently preferred embodiment, a polyurethane hydrophilic filler material in a solvent is coated onto the microporous matrix in order to facilitate spreading and covering the sheet thoroughly. As mentioned, coating may be carried out by any one of a number of conventional coating processes such as extrusion coating, roll coating, dip coating, or gravure coating, preferably by gravure coating techniques. After coating the polyurethane hydrophilic filler material into the microporous matrix, the solvent is removed by conventional methods such as flash evaporation or evaporation under reduced pressure, or even by simple evaporation. Conventional solvents are used for this purpose, for example, ketones such as methyl ethyl ketone and methyl isobutyl ketone; aromatic hydrocarbons such as toluene; ethers such as tetrahydrofuran; and halogenated hydrocarbons such as dichloromethane.

The cured hydrophilic filler material will swell or expand in volume to a certain degree. This volume increase should not be so great as to distort the waterproof sheet material to an extent that would cause buckling or curling when the sheet material is attached to adjacent layers in a garment or other end product formation. In this regard, it is preferred that the swellability (increase in volume), be less than about 100% based on the original volume. Typically, the swellability is on the order of about 35% to about 75%.

The presently preferred hydrophilic filler material is a polyurethane having a polyethylene oxide (sometimes referred to as polyoxyethylene) backbone. Polyethylene oxide is preferred because it remains in a softened or liquid state under ambient temperatures and is reasonably resistant to degradation in typical use situations. The polyethylene oxide moiety may be present as a multifunctional derivative of a polymer containing other monomer units, depending upon mode of synthesis, or it may be present as a copolymer with another alkylene oxide such as propylene oxide.

The polyethylene oxide is preferably an alcohol, and it is preferably polymerized with a polyisocyanate to form a polyurethane. The moisture vapor transmission rate of polyoxyethylene urethanes may be controlled by varying the proportion of polyethylene oxide. The polyethylene oxide moiety forms a separate phase within the urethane polymer through which the moisture vapor transmission rate will vary in proportion to the polyethylene oxide content, but not necessarily in a linear manner. The polyethylene oxide content is preferably greater than about 10% by weight in the urethane polymer to obtain preferred moisture vapor transmission rates of at least about 1000 grams per square meter (1000 g/m$^2$) per 24 hours. A commercially available hydrophilic filler material that embodies the requisite hydrophilic properties for use in the present invention is obtained by curing a hydrophilic polyurethane prepolymer sold under the registered trademark "Hypol," preferably Hypols 2000, 2002, 3000, 3100 and 4000, and most preferably "Hypol" FHP 2000, available from W.R. Grace & Company. "Hypol" is the trademark of a reactive polyurethane prepolymer that can be crosslinked by water, multifunctional amines, and polyols, to produce a crosslinked hydrophilic polymer. This prepolymer has polyoxyethylene backbone and terminal toluene diisocyanate units, each having an available unreacted NCO group.

It will be understood that other compounds and polymers may be used as the hydrophilic filler materials of the present invention. For example, silicone based hydrophilic polymers, such as carbinol terminated polydimethylsiloxanes (e.g., PS 555 and PS 556 ethylene oxide-dimethylsiloxane-ethylene oxide ABA block copolymers available from Petrarch Systems, Bristol, Pa.), may also be used.

The catalysis of the polymerization of the hydrophilic filler material is typically carried out in the presence of a conventional catalyst such as organo-tins, tertiary amines, and the like. However, it will be appreciated that the reactivity of the catalyst must be carefully chosen so as to avoid complete curing of the liquid hydrophilic filler material before stretching in the transverse direction has been achieved.

The hydrophilic filler material may include various additive ingredients which do not effect the water vapor transmissive properties or its ability to prevent passage of liquid water. Examples of possible additive materials include ultraviolet light stabilizers, antioxidants, bacteriostats, insect repellants, antistatic agents, and the like.

Although the presently preferred filler material of the present invention is a hydrophilic filler material as herein disclosed which may be used, for example, to provide a waterproof sheet, it will be appreciated that the methods of the present invention may be used to infiltrate virtually any filler material into a microporous structure. The precise nature of such filler materials will necessarily depend upon the precise application or end use involved. Thus, hydrophobic, hydrophilic, or combination filler materials in the form of urethanes, silicone compounds, or epoxies may be employed in the filler materials for various applications. In this regard, the methods of the present invention may be used to produce wound dressings, filters for the ultrafiltration of colloids, diffusion barriers, separators in electrochemical cells, filters for the filtration of liquids, filters for the filtration of gaseous streams, filters for the collection of samples such as microbes, and pin hole free static mats, as well as for the lamination to cloth or nonwoven materials to provide waterproof clothing.

The moisture vapor transmission characteristics of the waterproof sheet materials of the present invention are governed by the thickness of the sheet and the composition of the hydrophilic material. Generally, the moisture vapor transmission rate varies inversely with the thickness of the sheet, with thicker waterproof sheets having lower moisture vapor transmission rates. As mentioned, preferred sheet materials according to the present invention have a thickness on the order of from about 7 to about 125 micrometers, more preferably from about 7 to about 50 micrometers, most preferably from about 7 to about 25 micrometers.

A vapor pressure differential between opposite sides of the sheet promotes moisture vapor transmission through the sheet. Thus, when the sheet material of the invention is used in a rain garment, the wearer is maintained in a dry condition under exterior wet or rainy conditions because of the difference in water vapor pressure with temperature between the exterior of the garment and its interior, i.e., the area near the body. The surface insulative value of the sheet material of the present invention in the garment creates a temperature difference between the inside of the garment and the outside to provide the vapor pressure differential which promotes moisture vapor transmission from the wearer to the outside of the garment and keeps the wearer dry. If the wearer generates more moisture than can be transmitted through the sheet, e.g., by exercise, it may be desirable to include a layer of water sorbent material on the interior of the garment, next to the wearer. Suitable sorbent materials include webs of polymeric fibers.

Such webs of polymeric fibers may also include additional insulation for warmth. A preferred insulating material which can be used to form a layered construction with the sheet material of the present invention is sold under the registered trademark "Thinsulate" by the Minnesota Mining and Manufacturing Company, St. Paul, Minn.

It is preferred to employ the sheet material of the present invention as the inside layer of a garment with for the exterior layer to become wet. Therefore, the exterior layer is preferably a breathable fabric which is treated to be water repellent. Fabrics for use as the exterior layer include tightly woven fabrics of fine hydrophobic fibers including polyolefin fibers such as polyethylene and polypropylene, nylon, blends of such fibers with natural fibers such as cotton and other fibers, any of which may be treated with water repellents. Preferred fabrics for the exterior of a layered construction include nylon cloths such as nylon tricot and cloth available under the trademarks "Taslin" or "Ripstop,"

cotton/polyester blends, and the like. Suitable water repellent materials for treatment of the exterior fabric are commercially available, for example, under the trademark "Scotchgard" (Minnesota Mining and Manufacturing Company) or "Zepel" (DuPont de Nemours and Company, Wilmington, Del.).

The unitary sheet materials of the present invention are conveniently prepared by applying to the surface of the microporous matrix a liquid, curable composition comprising a precursor of the hydrophilic material or the hydrophilic material itself, before the transverse stretching step as previously explained. Depending upon the microporous matrix, it may easily imbibe the liquid filler material or it may require preparation prior to coating. Viscosity adjustment of the liquid filler material may be needed in some cases to obtain good penetration by capillary action into the pores. In some cases, it may be necessary to treat the surface of the microporous matrix to make it more receptive to imbibing the liquid filler material. For example, a microporous polytetrafluoroethylene matrix may be prewet with tetrahydrofuran to make it more receptive to solvent solutions which do not readily wet its surface.

Importantly, by coating the microporous matrix with the liquid filler material before the transverse stretch of the film, infiltration of the liquid filler material into the pores of the film is greatly enhanced. In this regard, it is believed that the stretching action, in conjunction with normal capillary action, serves to pull the liquid filler material into the pores of the microporous matrix so as to substantially fill the pores. Further, the presence of the liquid filler material appears to provide lubrication for the transverse stretching step, allowing the film to be stretched more easily than an uncoated film, with a resultant improvement in uniformity of caliper. The resultant unitary sheet has exceptional smoothness and uniformity, exceeding that of the materials provided by U.S. Pat. No. 4,613,544.

It is preferred that the coating operation not leave substantial quantities of the hydrophilic filler material on either exterior surface of the completed unitary sheet material. While minor amounts of hydrophilic filler material on the surface of the sheet are not detrimental, excessive amounts may adversely affect the surface texture (e.g., the "feel" of the unitary sheet material), and may also weaken laminates made of the unitary sheet material and other materials because the hydrophilic material typically has a lower cohesive integrity than that of the microporous matrix. Lamination of other sheet materials or fabrics directly to the unitary sheet material, rather than to a surface layer of hydrophilic filler material, will therefore provide a more delamination-resistant article.

The conditions under which the hydrophilic filler material or precursor is solidified will depend upon the particular type of liquid filler material employed. Liquid filler compositions which comprise the hydrophilic material and solvent will require solvent removal which may be accomplished with the aid of moderate heating. Hydrophilic filler materials which are formed from curable precursors are cured under appropriate curing conditions, depending upon the particular precursor. Monomeric materials and prepolymers are cured according to the requisite curing conditions, usually requiring heat or light.

The resultant waterproof, moisture vapor permeable sheet materials are useful for making any of a variety of products. Examples of such products include garments such as raincoats, skiing apparel, snowmobile suits, snowsuits, gloves, shoes, garments to be worn in areas where chemical spills may be encountered, clean room garments, and the like. The sheet materials of the present invention may also be utilized in medical applications as wound dressings. The sheet materials may also be used to make tents and other types of camping equipment.

For such uses, the sheet material is typically cut to form pieces which are sewn to form a garment, preferably taking care to prevent leakage at the seams by conventional techniques. Wound dressings are typically sterilized prior to use according to conventional techniques and may include other modifications such as absorbent pads and medicaments.

EXAMPLE 1

In this example, a water vapor permeable, liquid water impermable sheet material within the scope of the present invention comprising a microporous film of polyethylene infiltrated with a polyurethane hydrophilic filler material was prepared.

The microporous film or matrix was first prepared by extruding through a film die (having a slit opening of 0.05 cm) a melt blend of 45% by weight polyethylene ("Hostalgen GM 9255", obtained from American Hoechst Plastics, Leominster, Mass.) and 55% by weight mineral oil ("White Mineral Oil #31-USP", obtained from Amoco Chemical Corp., Chicago, Ill.) that had been heated to about 25° C. above the melting point of the polyethylene (i.e., to a temperature of about 160° C.) until the polyethylene and mineral oil were miscible, depositing the extruded film onto a quenching wheel (maintained at a temperature of about 50° C.) where the polyethylene phase separated from the mineral oil to create distinct particles of polyethylene with mineral oil between the particles but having points of continuity between adjacent particles, thus producing a quenched film having an average thickness of about 81 micrometers.

The quenched film was washed at about 20° C. with 1,1,1-trichloroethane to remove substantially all of the mineral oil, leaving less than 2% by weight mineral oil based on the weight of the film. The oil-extracted film was then length oriented at a temperature of about 80° C. and stretched by a factor of about 3.0 in the machine (lengthwise) direction (to a thickness of about 38 micrometers) to attenuate the polyethylene particles at the points of continuity to form a fibrils and provide porosity.

After length orientation, the microporous film was then coated with a precursor of a polyurethane hydrophilic filler material which was prepared by mixing the ingredient set forth immediately below (without concern as to the order of addition) using a 3-blade laboratory mixer under ambient conditions, in accordance with the procedure set forth in U.S. Pat. No. 4,613,544.

| Hydrophilic Precursor Material | |
|---|---|
| Parts (by weight) | Ingredient |
| Solution A | |
| 750 | Polyurethane prepolymer having an equivalent weight of 625 grams per NCO equivalent, a density of 1.19 g/ml at 25° C., a viscosity of 10,000–15,000 cps at 25° C., namely, "Hypol" FHP 2000 available from W. R. Grace Co., |

| Hydrophilic Precursor Material | |
|---|---|
| Parts (by weight) | Ingredient |
| | Lexington, Massachusetts. |
| 350 | Difunctional polyoxyethylene end-capped with hydroxyl groups, having a molecular weight of 600 grams, namely, "Carbowax" 600 available from the Union Carbide Co., Danbury, Connecticut. |
| 1100 | Methyl ethyl ketone |
| | Solution B |
| 20 | Dibutyl tin dilaurate as a 2% by weight solution in toluene. |

Solutions A and B above were prepared independently, and were mixed just prior to the coating of this polyurethane precursor solution onto the microporous film. Upon mixing, the combined precursor solution began to slowly polymerize.

The microporous film was coated so as to fill the pores of the microporous film with the precursor solution by passing the film through a rotogravure press equipped with a 16 line/cm trihelical gravure. After passing through the rotogravure press, the pores of the film were infiltrated with the precursor solution. The coated film was then passed through an oven dryer (heated to about 60° C.) which removed the methyl ethyl ketone solvent in which the hydrophilic precursor material had been carried to facilitate its application.

The coated film was then stretched in the transverse (widthwise) direction by a factor of about 4.0 at a temperature of about 65° C. to provide a resulting thickness of about 10 micrometers. The polyurethane infiltrate in the polyethylene sheet was then completely cured to a solid state by heating the coated sheet to about 110°–115° C. for about 5 minutes in a continuous-pass oven. The weight of the polyurethane infiltrate incorporated into the polyethylene matrix was about 10.8 g/m$^2$, resulting in an add-on percent of about 300%.

EXAMPLE 2

In this example, a unitary sheet material within the scope of the present invention was prepared in accordance with Example 1 except that the polyethylene/mineral oil ratio was 42%/58% and with the following additional exceptions. After the mineral oil had been removed with the 1,1,1-trichloroethane, the film was length oriented by a factor of about 2.8 to provide a thickness of about 45 micrometers. Moreover, the hydrophilic filler material used in this Example 2 was prepared in the same manner as the hydrophilic filler material used in Example 1, except that Hypol 2002 available from W. R. Grace Co. and Pluracol Pep 550 available from BASF Wyandotte, Parsippany, N. J. were used instead of the Hypol FHP 2000 and Carbowax 600, respectively, used in Example 1. In this Example 2, about 920 parts by weight Hypol 2002 and about 180 parts by weight Pluracol Pep 550 were used so as to maintain the stoichiometric ratio of isocyanate equivalent weight to hydroxyl equivalent weight used in Example 1. Finally, the film in this Example 2 was width oriented by a factor of about 2.2 during the transverse stretching step to provide a thickness of about 30 micrometers, and after the transverse stretching, the infiltrate in the microporous sheet was completely cured by heating the coated sheet to about 100° C. for about 5 minutes in the continuous-pass oven.

EXAMPLE 3

In this example, a unitary sheet material within the scope of the present invention was prepared in accordance with Example 1, except that the polyethylene/mineral oil ratio was 38%/62%, the thickness of the extruded film after quenching was about 61 micrometers, and with the following additional exceptions. After the mineral oil had been removed, the film was length oriented by a factor of about 2.4 to provide a thickness of about 38 micrometers. Further, the hydrophilic filler material used to infiltrate the microporous film in this Example 3 was prepared in accordance with Example 1 substituting Desmodur N available from Mobay Chemicals, Pittsburgh, Pa. and Pluronic 10R5 available from BASF Wyandotte for the Hypol FHP 2000 and Carbowax 600, respectively, used in Example 1. In this Example 3, about 180 parts by weight Desmodur N and about 920 parts by weight Pluronic 10R5 were used so as to maintain the stoichiometric ratio of isocyanate equivalent weight to hydroxyl equivalent weight used in Example 1. After removal of the methyl ethyl ketone solvent, the coated film was width oriented by a factor of about 2.5 to provide a thickness of about 20 micrometers, and cured by heating to about 110° C. for about 5 minutes in the continuous-pass oven.

EXAMPLE 4

In this example, a unitary sheet material within the scope of the present invention was prepared in accordance with Example 3 with the sole exception that the film was length oriented by a factor of about 2.6 to provide a thickness of about 33 micrometers.

EXAMPLE 5

In this example, a unitary sheet material within the scope of the present invention was prepared in accordance with Example 3 with the sole exception that the weight of the polyurethane infiltrate incorporated into the polyethylene matrix was about 8.3 g/m$^2$, resulting in an add-on percent of about 230% (as opposed to an add-on percent of 300% used in Example 3).

Various physical properties of the unitary sheet materials produced in each of Examples 1–5 were tested and are summarized in Table I below. For each of the physical properties summarized in Table I, as well as the physical properties summarized in Table II to follow, the Gurley Porosity Test, Moisture Vapor Transmission Test, Tensile Strength Test, Elongation Test, Mullen Burst Test, and Liquid Proofness Test were carried out and orientation ratios were determined for each of the examples in accordance with the tests for determining the same which are set forth in U.S. Pat. No. 4,613,544.

TABLE I

| | Example 1 | Example 2 | Example 3 | Example 4 | Example 5 |
|---|---|---|---|---|---|
| Thickness of Final Unitary Sheet Material (micrometers) | 10 | 30 | 20 | 15 | 20 |
| MVTR (g/m$^2$-24 hr) | 13,000 | 10,290 | 11,870 | 12,450 | 12,140 |

TABLE I-continued

|  | Example 1 | Example 2 | Example 3 | Example 4 | Example 5 |
|---|---|---|---|---|---|
| Tensile Strength Down Web (g/cm) | 223 | 715 | 465 | 393 | 357 |
| Tensile Strength Cross Web (g/cm) | 268 | 500 | 322 | 286 | 271 |
| Elongation Down Web | 100% | 450% | 267% | 243% | 194% |
| Elongation Cross Web | 100% | 450% | 300% | 281% | 347% |

EXAMPLE 6

In this example, a roll of microporous polyethylene film having an average thickness of about 51 micrometers was prepared in accordance with Example 25 of U.S. Pat. No. 4,539,256, except that the film was length oriented by a factor of about 2.6 to produce a film about 36 micrometers thick and about 51 centimeters wide. However, before stretching in the transverse direction, this film was coated with the hydrophilic material of Example 1 of U.S. Pat. No. 4,613,544, using the extrusion gravure system described in Example 1 of the present specification, with a web speed of about 15 meters per minute. The coated film was then passed through a solvent removal oven at a temperature of about 104° C. for about 30 seconds to remove the solvent. Next, the film was width oriented by a factor of about 2.4 at a temperature of about 50° C., and the resultant film was heat set and cured at a temperature of about 115° C. for about 30 seconds. The resultant unitary sheet material had a thickness of about 18 micrometers and a width of about 122 centimeters.

Certain properties of the unitary sheet material produced in this Example 6 were tested, and are summarized in Table II below.

TABLE II

| Thickness of Final Unitary Sheet Material | 18 μm |
|---|---|
| Mullen Burst Test | >45 kg |
| Liquid Proofness Test | No leaks |
| Tensile Strength Down Web | 447 g/cm |
| Tensile Strength Cross Web | 357 g/cm |
| Elongation Down Web | 300% |
| Elongation Cross Web | 250% |
| Moisture Vapor Transmission Rate | >10,000 g/m²-24 hr |
| Gurley Porosity (Seconds to pass 50 ml) | Infinite |
| Length Orientation Ratio | 2.6:1 |
| Width Orientation Ratio | 2.4:1 |

The presence invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced in their scope.

What is claimed and desired to be secured by U.S. Letter Patent is:

1. A unitary sheet material made according to a method comprising the steps of:
    preparing a sheet of polymeric material, said preparing step comprising:
    melt blending to form a solution comprising a crystallizable thermoplastic polymer and a compound with which said thermoplastic polymer is miscible and in which said thermoplastic polymer will dissolve at the melting temperature of said thermoplastic polymer but which will phase separate on cooling to a temperature at or below the crystallization temperature of said thermoplastic polymer;
    forming a sheet from the melt blended solution; and
    cooling said sheet to a temperature at which said thermoplastic polymer crystallizes to cause phase separation to occur between said compound and said polymer, thereby providing said sheet with an aggregate of a first phase comprising particles of crystallized thermoplastic polymer in a second phase comprising said compound with adjacent thermoplastic polymer particles being distinct but having a plurality of zones of continuity;
    stretching said polymeric sheet in a first direction so as to render said sheet more microporous;
    coating said polymeric sheet, after said polymeric sheet has been stretched in the first direction, with a liquid filler material which is capable of infiltrating the micropores of said polymeric sheet;
    stretching said coated polymeric sheet, after said coating step, in a second direction so as to render said polymeric sheet more microporous, said stretching of said polymeric sheet in the second direction serving to enhance infiltration of said liquid filler material into the micropores of said polymeric sheet; and
    converting said liquid filler material from a liquid state to a relatively solid state.

2. A method of making a unitary sheet material from a polymeric material and a filler material, the method comprising the steps of:
    preparing a sheet of polymeric material, said preparing step comprising:
    melt blending to form a solution comprising a crystallizable thermoplastic polymer and a compound with which said thermoplastic polymer is miscible and in which said thermoplastic polymer will dissolve at the melting temperature of said thermoplastic polymer but which will phase separate on cooling to a temperature at or below the crystallization temperature of said thermoplastic polymer;
    forming a sheet from the melt blended solution; and
    cooling said sheet to a temperature at which said thermoplastic polymer crystallizes to cause phase separation to occur between said compound and said polymer, thereby providing said sheet with an aggregate of a first phase comprising particles of crystallized thermoplastic polymer in a second phase comprising said compound with adjacent thermoplastic polymer particles being distinct but having a plurality of zones of continuity;
    stretching said polymeric sheet in a first direction so as to render said sheet more microporous;
    coating said polymeric sheet, after said polymeric sheet has been stretched in the first direction, with a liquid filler material which is capable of infiltrating the micropores of said polymeric sheet;
    stretching said coated polymeric sheet, after said coating step, in a second direction so as to render said polymeric sheet more microporous, said stretching of said polymeric sheet in the second direction serving to enhance infiltration of said liquid filler material into the micropores of said polymeric sheet; and converting said liquid filler material from a liquid state to a relatively solid state.

3. A method as defined in claim 2 wherein said polymer comprises a polyolefin.

4. A method as defined in claim 3 wherein said polymer comprises polyethylene.

5. A method as defined in claim 1 wherein said compound is removed from said sheet after said cooling step.

6. A method as defined in claim 5 wherein said compound is removed by solvent extraction.

7. A method as defined in claim 1 wherein said polymeric sheet is stretch about 600% or less in the first direction.

8. A method as defined in claim 1 wherein said polymeric sheet has a thickness of from about 25 micrometers to about 150 micrometers after stretching in the first direction.

9. A method as defined in claim 1 wherein said liquid filler material is a precursor of a solid hydrophilic material which is water vapor permeable and liquid water impermeable.

10. A method as defined in claim 9 wherein said hydrophilic material comprises a polyurethane having a polyoxyethylene backbone.

11. A method as defined in claim 9 wherein said precursor has a viscosity of from about 1 centipoise to about 500 centipoise.

12. A method as defined in claim 1 wherein said liquid filler material is gravure coated onto said polymeric sheet.

13. A method as defined in claim 12 wherein said liquid filler material is gravure coated at a pressure of from about 10 psi to about 100 psi.

14. A method as defined in claim 1 wherein the weight of said liquid filler material applied during said coating step represents from about 50% to about 600% of the weight of the uncoated polymeric sheet.

15. A method as defined in claim 1 wherein said liquid filler material is solvent coated onto said polymeric sheet and further comprising the step of heating said coated polymeric sheet before stretching in the second direction so as to substantially evaporate the solvent away from the liquid filler material.

16. A method as defined in claim 15 wherein said liquid filler material is curable and wherein said heating step is done at a temperature and for a time sufficient to evaporate the solvent while avoiding complete curing of said filler material before stretching in the second direction.

17. A method as defined in claim 15 wherein said liquid filler material is a precursor of a polyurethane and wherein said heating step is done at a temperature of from about 20° C. to about 150° C. for a period of from about 10 seconds to about 60 seconds.

18. A method as defined in claim 17 wherein said heating step is done at a temperature of from about 75° C. to about 110° C. for a period of about 20 seconds to about 40 seconds.

19. A method as defined in claim 1 wherein during stretching in the second direction said coated polymeric sheet is heated to a temperature of from about 35° C. to about 95° C. for a period of from about 10 seconds to about 60 seconds.

20. A method as defined in claim 1 wherein said coated polymeric sheet is stretched about 600% or less in the second direction.

21. A method as defined in claim 1 wherein said liquid filler material is curable into said relatively solid state and wherein, after stretching in the second direction, said converting step comprises heating said coated polymeric sheet to a temperature and for a period of time sufficient to completely cure said filler material into said solid state.

22. A method as defined in claim 21 wherein said liquid filler material is a precursor of a polyurethane and wherein said converting step comprises heating said coated polymeric sheet, after stretching in the second direction, to a temperature of from about 35° C. to about 150° C. for at least about 20 seconds so as to cause complete conversion of said precursor into said polyurethane.

23. A method as defined in claim 22 wherein said converting step comprises heating said coated polymeric sheet to a temperature of from about 95° C. to about 125° C. for about 40 seconds to about 5 minutes.

24. A method as defined in claim 21 wherein heating also serves to heat set said polymeric sheet.

25. A method as defined in claim 1 wherein after the converting step said polymeric sheet has a moisture vapor transmission rate of at least about 1000 g/m$^2$ per 24 hours.

26. A method as defined in claim 1 wherein after said converting step said polymeric sheet has a thickness of from about 7 micrometers to about 125 micrometers.

27. A method as defined in claim 1 further comprising the step of laminating a fabric to said polymeric sheet after said converting step.

28. A method of preparing a breathable, waterproof material, the method comprising the steps of:

preparing a sheet of polymeric material, said preparing step comprising:

melt blending to form a solution comprising a crystallizable thermoplastic polymer and a compound with which said thermoplastic polymer is miscible and in which said thermoplastic polymer will dissolve at the melting temperature of said thermoplastic polymer but which will phase separate on cooling to a temperature at or below the crystallization temperature of said thermoplastic polymer;

forming a sheet from the melt blended solution; and cooling said sheet to a temperature at which said thermoplastic polymer crystallizes to cause phase separation to occur between said compound and said polymer, thereby providing said sheet with an aggregate of a first phase comprising particles of crystallized thermoplastic polymer in a second phase comprising said compound with adjacent thermoplastic polymer particles being distinct but having a plurality of zones of continuity;

stretching said polymeric sheet from about 100% to about 400% in the lengthwise direction so as to render said sheet more microporous;

coating said polymeric sheet, after said polymeric sheet has been stretched in the lengthwise direction, with a liquid filler material which can be cured to form a solid hydrophilic material which is water vapor permeable and liquid water impermeable, said liquid filler material being capable of substantially filling the micropores of said polymeric sheet;

stretching said coated polymeric sheet, after said coating step, from about 100% to about 400% in the transverse direction so as to render said polymeric sheet more microporous, said stretching of said polymeric sheet in the transverse direction serving to significantly enhance infiltration of said liquid filler material into the micropores of said polymeric sheet; and converting said liquid filler material into said solid hydrophilic material by heating said infiltrated polymeric sheet to a temperature and for a period of time sufficient to completely cure said filler material.

29. A method as defined in claim 28 wherein said polymeric sheet is stretched from about 200% to about 300% in the lengthwise direction.

30. A method as defined in claim 28 wherein said polymeric sheet has a thickness of from about 30 micrometers to about 75 micrometers after stretching in the lengthwise direction.

31. A method as defined in claim 28 wherein said liquid filler material has a viscosity of from about 10 centipoise to about 100 centipoise.

32. A method as defined in claim 28 wherein the weight of said liquid filler material applied during said coating step represents from about 100% to about 500% of the weight of the uncoated polymeric sheet.

33. A method as defined in claim 28 wherein during stretching in the transverse direction said coated polymeric sheet is heated to a temperature of from about 55° C. to about 80° C. for a period of from about 20 seconds to about 40 seconds.

34. A method as defined in claim 28 wherein said coated polymeric sheet is stretched from about 150% to about 300% in the transverse direction.

35. A method as defined in claim 28 wherein after said converting step said polymeric sheet has a thickness of from about 7 micrometers to about 50 micrometers.

36. A method as defined in claim 28 wherein:

said polymeric sheet is stretched from about 200% to about 300% in the lengthwise direction;

said polymeric sheet has a thickness of from about 33 micrometers to about 51 micrometers after stretching in the lengthwise direction;

said liquid filler material has a viscosity of from about 20 centipoise to about 60 centipoise;

the weight of said liquid filler material applied during said coating step represents from about 300% to about 400% of the weight of the uncoated polymeric sheet;

during stretching in the transverse direction said coated polymeric sheet is heated to a temperature of from about 60° C. to about 77° C. for a period of from about 20 seconds to about 40 seconds;

said coated polymeric sheet is stretched from about 200% to about 300% in the transverse direction; and after said converting step said polymeric sheet has a thickness of from about 7 micrometers to about 25 micrometers.

37. A method as defined in claim 2 wherein the weight of said liquid filler material applied during said coating step represents from about 100% to about 500% of the weight of the uncoated polymeric sheet.

38. A method as defined in claim 2 wherein the weight of said liquid filler material applied during said coating step represents from about 300% to about 400% of the weight of the uncoated polymeric sheet.

39. A method as defined in claim 2 wherein said polymeric sheet is stretched from about 100% to about 400% in the first direction.

40. A method as defined in claim 2 wherein said polymeric sheet is stretched from about 200% to about 300% in the first direction.

41. A method as defined in claim 2 wherein said polymeric sheet is stretched from about 100% to about 400% in the second direction.

42. A method as defined in claim 2 wherein said polymeric sheet is stretched from about 150% to about 300% in the second direction.

* * * * *

UNITED STATES PATENT AND TRADEMARK OFFICE
CERTIFICATE OF CORRECTION

PATENT NO. : 4,833,026

DATED : May 23, 1989

INVENTOR(S) : William L. Kausch

It is certified that error appears in the above-identified patent and that said Letters Patent is hereby corrected as shown below:

Col. 1, line 29, "Gore et al.)" should read --(Gore et al.)--.

Col. 1, line 42, "polytetrafluoro-ethylene" should read --polytetrafluoroethylene--.

Figure 5A:
FIG. 5A is a photomicrograph (taken at a magnification of 5000×) of the surface structure of a coated polyethylene sheet made in accordance with Example 3, after the polyethylene sheet had been stretched in the lengthwise direction, after the sheet had been coated with the liquid polyurethane precursor material, and after the sheet had been stretched in the transverse direction. As seen in this and each of FIGS. 5B and 5C, complete infiltration of the liquid polyurethane precursor material into the pores of the sheet is achieved by the transverse stretching step, thereby providing a virtually solid composite or unitary sheet material.
Figure 5B:
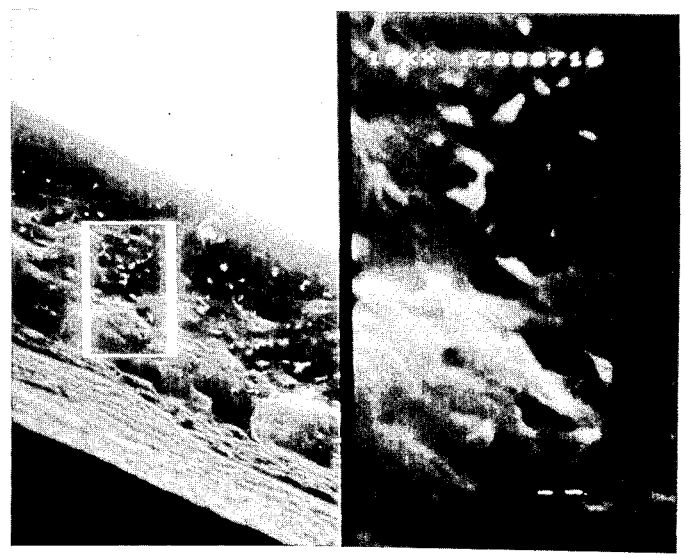
FIG. 5B is a photomicrograph of the internal structure of the coated polyethylene sheet of FIG. 5A taken along a cross-section of the coated polyethylene sheet. The left half of the photomicrograph is shown at a magnification of 2000×, and a portion of the left half (identified by a small rectangular border within the left half) is further enlarged to a magnification of 10,000× and is presented as the right half of the photomicrograph in order to show further details of the internal structure of the coated polyethylene sheet.
Figure 5C:
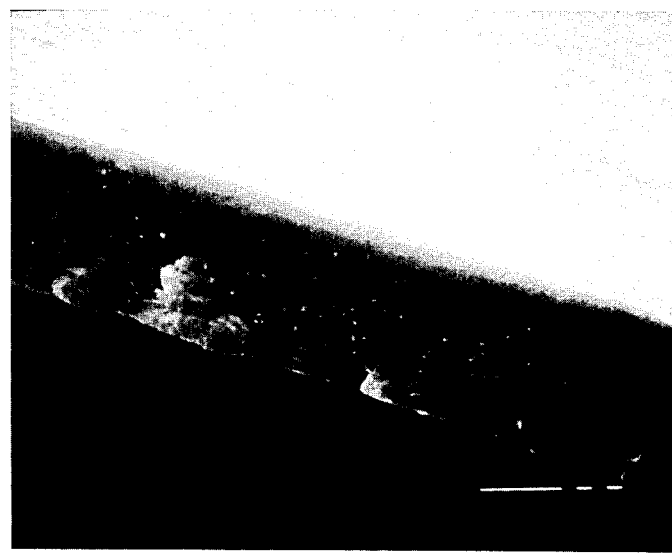
FIG. 5C is a perspective photomicrograph of the surface and edge of the coated polyethylene sheet of FIG. A shown at a magnification of 1500×.

Col. 5, line 68, "FIG. A" should read --FIG. 5A--.

Col. 9, line 18, "2.0" should read --20--.

Col. 11, line 49, delete "940,731" and insert therefor -4,726,989--.

Col. 14, line 58, before "for" insert --a preferably stronger exterior layer. It is undesirable--.

Col. 16, line 54, "ingredient" should read --ingredients--.

Col. 19, line 48, "presence" should read --present--.

Signed and Sealed this

Tenth Day of April, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,833,026

DATED : May 23, 1989

INVENTOR(S) : William L. Kausch

It is certified that error appears in the above-identified patent and that said Letters Patent is hereby corrected as shown below:

Col. 9, line 23, "center" should read --tenter--.

Signed and Sealed this

Twentieth Day of November, 1990

Attest:

HARRY F. MANBECK, JR.

*Attesting Officer*  *Commissioner of Patents and Trademarks*